(12) United States Patent
Haneishi et al.

(10) Patent No.: US 8,612,143 B2
(45) Date of Patent: Dec. 17, 2013

(54) PASSAGE DETERMINATION DEVICE AND PASSAGE DETERMINATION METHOD

(75) Inventors: Tadashi Haneishi, Tokyo (JP); Tatsugo Ukegawa, Osaka (JP)

(73) Assignees: NEC Biglobe, Ltd., Tokyo (JP); NEC System Technologies, Ltd., Osaka-shi, Osaka (JP)

( * ) Notice: Subject to any disclaimer, the term of this patent is extended or adjusted under 35 U.S.C. 154(b) by 164 days.

(21) Appl. No.: 13/137,483

(22) Filed: Aug. 19, 2011

(65) Prior Publication Data

US 2012/0053828 A1  Mar. 1, 2012

(30) Foreign Application Priority Data

Aug. 24, 2010 (JP) ................................ 2010-187139

(51) Int. Cl.
*G01C 21/00* (2006.01)
(52) U.S. Cl.
USPC ........................... 701/467; 701/468; 701/472
(58) Field of Classification Search
None
See application file for complete search history.

(56) References Cited

U.S. PATENT DOCUMENTS

| 2005/0004746 A1 | 1/2005 | Morita et al. | |
|---|---|---|---|
| 2008/0243321 A1* | 10/2008 | Walser et al. | 701/21 |
| 2009/0157308 A1* | 6/2009 | Ogawa | 701/209 |

FOREIGN PATENT DOCUMENTS

| JP | 6-201850 A | | 7/1994 |
|---|---|---|---|
| JP | 09-146621 | * | 6/1997 |
| JP | 10-055465 | * | 2/1998 |
| JP | 11-166988 A | | 6/1999 |
| JP | 2000-259977 A | | 9/2000 |
| JP | 2002-156435 A | | 5/2002 |
| JP | 2003-042776 A | | 2/2003 |
| JP | 2003-254768 A | | 9/2003 |
| JP | 2007-263878 | * | 10/2007 |

OTHER PUBLICATIONS

Japanese Office Action dated Jul. 10, 2012, with partial English translation.

* cited by examiner

*Primary Examiner* — James Trammell
*Assistant Examiner* — Demetra Smith-Stewart
(74) *Attorney, Agent, or Firm* — McGinn IP Law Group, PLLC

(57) ABSTRACT

The passage determination device according to the present invention includes: a storage; a position information obtaining unit that obtains positions of the device at predetermined intervals; and a controller that causes the storage to store a course and a position of a passage point on the course set in advance by the user, and that causes the storage to store the positions obtained by the position information obtaining unit as well as times at which the positions are obtained, wherein the controller determines, if positions of the device enter a predetermined range of the passage point, a time at which the user passes through the passage point based on a position, from among the obtained positions within the predetermined range, that is closest to the passage point and a time at which the position is obtained.

10 Claims, 12 Drawing Sheets

Fig. 3 course information
  course name: ○○ course
    course position: (position) ~ (position) ~ (position) ~ ...
    starting point: (position)
    ending point: (position)
    passage point #1: (position, priority)
    passage point #2: (position, priority)
      :

course name: △△ course
    course position: (position) ~ (position) ~ (position) ~ ...
    starting point: (position)
    ending point: (position)
    passage point #1: (position, priority)
    passage point #2: (position, priority)
      :

Fig. 11 training information
    course name: ○○ course
      date: a/A/2010
      track point: (position, time), (position, time), ・・・
      starting time: (time)
      ending time: (time)
      passage time of passage point #1: (time)
      passage time of passage point #2: (time)
        :

date: b/A/2010
      track point: (position, time), (position, time), ・・・
      starting time: (time)
      ending time: (time)
      passage time of passage point #1: (time)
      passage time of passage point #2: (time)
        :

course name: △△ course
      date: c/B/2010
      track point: (position, time), (position, time), ・・・
      starting time: (time)
      ending time: (time)
      passage time of passage point #1: (time)
      passage time of passage point #2: (time)
        :

PASSAGE DETERMINATION DEVICE AND PASSAGE DETERMINATION METHOD

This application is based upon and claims the benefit of priority from Japanese patent application No. 2010-187139, filed on Aug. 24, 2010, the disclosure of which is incorporated herein in its entirety by reference.

BACKGROUND OF THE INVENTION

1. Field of the Invention

The present invention relates to a technique for determining the time at which a user passes through a passage point set in advance on a course along which the user travels in training.

2. Description of the Related Art

In recent years, because of the rise in health consciousness, the number of people who train is increasing. In particular, training in which a bicycle is used can be conducted anywhere, for example, on public roads, and has been gaining popularity as familiar and simple training.

Therefore, recently, a number of techniques for supporting training that uses bicycles has been realized. For example, JP11-166988A discloses a technique that uses a device mounted on a movable object, such as a bicycle, to determine the time at which a user passes through a passage point pre-set on a course traveled along by the user.

Specifically, in the technique disclosed in JP11-166988A, if the present position of the movable object determined by the GPS (Global Positioning System) enters a predetermined range centered around a position of the pre-set passage point, the time is determined to be a passage time at which the user passes through the passage point.

As noted above, in the technique disclosed in JP11-166988A, the time at which the present position of the movable object determined by the GPS enters a predetermined range of a passage point is determined to be the passage time of the passage point.

However, because the GPS has a positioning error, even if the movable object is actually outside of the predetermined range of the passage point, disadvantageously the device may recognize that the movable object enters the predetermined range and determine the time as the passage time, resulting in low determination accuracy of the passage time.

SUMMARY OF THE INVENTION

Thus, an object of the present invention is to provide a passage determination device and a passage determination method that can improve determination accuracy of the passage time of a passage point.

A passage determination device according to the present invention is a passage determination device carried by a user who travels along a pre-set course by any means as training, the device comprising: a storage; a position information obtaining unit that obtains positions of the device at predetermined intervals; and a controller that causes the storage to store a course and a position of a passage point on the course set in advance by the user, and that causes the storage to store the positions obtained by the position information obtaining unit as well as times at which the positions are obtained, wherein the controller determines, if positions of the device enter a predetermined range of the passage point, the time at which the user passes through the passage point based on a position, from among the obtained positions within the predetermined range, that is closest to the passage point and the time at which the position is obtained.

A passage determination method according to the present invention is a passage determination method adopted to a passage determination device carried by a user who travels along a pre-set course by any means as training, the method comprising: causing the storage to store a course and a position of a passage point on the course set in advance by the user; obtaining positions of the device at predetermined intervals and causing the storage to store the obtained positions and times at which the positions are obtained; and determining a time of passage at which the user passes through the passage point based on, if positions of the device enter a predetermined range of the passage point, a position, from among the obtained positions within the predetermined range, closest to the passage point and a time at which the position is obtained.

According to the passage determination device of the present invention, when positions obtained by the device enter a predetermined range of a passage point, the device determines the time at which the user has passed through the passage point based on, of the obtained positions within the predetermined range, a position closest to the passage point and, the time at which the position is obtained.

As noted above, unlike the related arts in which when positions of the device enter a predetermined range of a passage point, the time is immediately determined to be the time of passage, in this exemplary embodiment, the time of passage is determined based on a position, of positions within a predetermined range, closest to the passage point and the time at which the position is obtained.

Thus, even if a position of the device has a positioning error, it is highly likely that the determined time of passage is close to the actual time of passage. As a result, the determination accuracy of the passage time of the passage point can be improved.

The above and other objects, features, and advantages of the present invention will become apparent from the following description with reference to the accompanying drawings which illustrate examples of the present invention.

BRIEF DESCRIPTION OF THE DRAWINGS

FIG. 3 illustrates an example of course information stored in a storage illustrated in FIG. 1;

FIG. 11 illustrates an example of training information stored in the storage illustrated in FIG. 1.

DESCRIPTION OF THE PREFERRED EMBODIMENTS

Hereinafter, exemplary embodiments will be described with reference to the drawings.

It should be noted that in the exemplary embodiments described below, it is assumed that a passage determination device of the present invention is carried by a user who rides a bicycle along a pre-set course as training.

Figure 1:
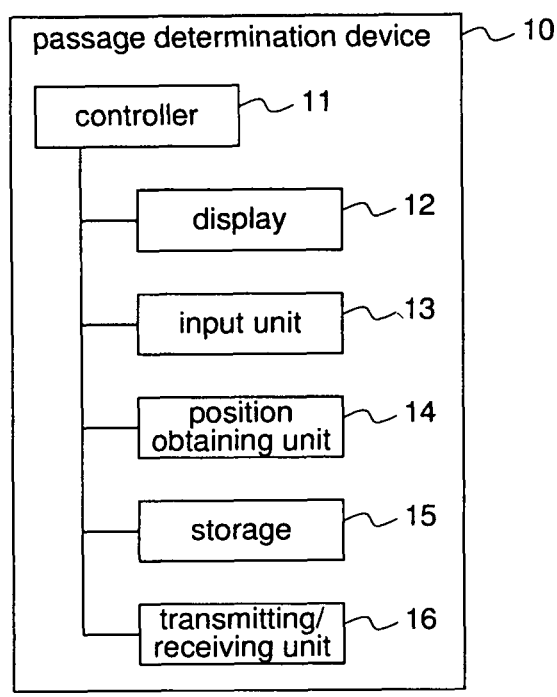
FIG. 1 is a block diagram illustrating a configuration of a passage determination device according to an exemplary embodiment.

As illustrated in FIG. 1, passage determination device 10 of the exemplary embodiment includes controller 11, display 12, input unit 13, position obtaining unit 14, storage 15, and transmitting/receiving unit 16.

Controller 11 controls the components in passage determination device 10 to perform various types of processing.

Display 12 displays various types of information on a screen. The screen has thereon a touch panel.

Input unit 13 is the touch panel on the screen of display 12 and a button on the housing of passage determination device 10.

Position obtaining unit 14 is activated by the user turning on the GPS through input unit 13 and obtains a present position (latitude, longitude) of passage determination device 10 at predetermined intervals by using the GPS.

Storage 15 stores various types of information.

Transmitting/receiving unit 16 transmits and receives various types of information to/from a device outside passage determination device 10.

It should be noted that specific operations of these components in passage determination device 10 will be described in detail in the following operation description.

Now, the operation of passage determination device 10 of the exemplary embodiment will be described.

(A) Setting Operation of Passage Point

Figure 2:
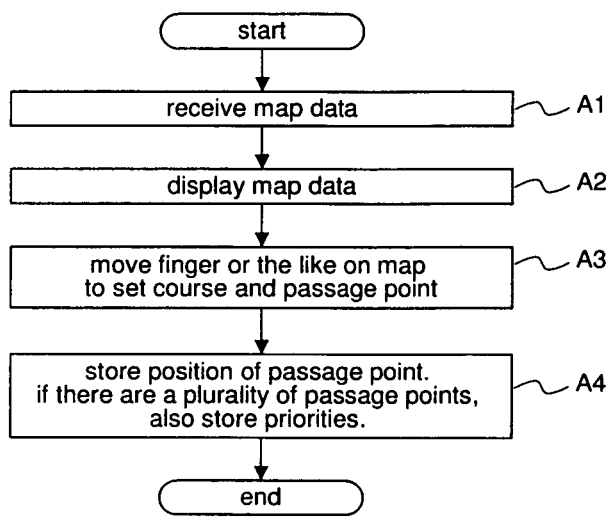
FIG. 2 is a flow chart showing a passage point setting operation in the passage determination device illustrated in FIG. 1.

First, a passage point setting operation is described by referring to a flow chart shown in FIG. 2.

As shown in FIG. 2, first, in step A1, controller 11 uses transmitting/receiving unit 16 to receive map data from a device outside passage determination device 10, and in step A2, controller 11 displays the map data received in step A1 on the screen of display 12.

Next, in step A3, the user uses input unit 13 to set a course name, moves a finger or the like on the map data displayed on the screen to set a course, and touches a desired position on the course to set a passage point. The setting method is not restrictive thereto, and another method may be adopted. At this time, the user may also set a starting point and an ending point optionally.

Then, in step A4, controller 11 causes storage 15 to store the course name and the position of the passage point set in step A3. It should be noted that if a plurality of passage points are set in step A3, controller 11 sets priorities to the passage points according to the order of the user passing through the points, and causes storage 15 to store the set priorities. Meanwhile, in step A3, if the starting point and the ending point are set, their positions of them are also stored in storage 15. An example of information (course information) stored at this time is shown in FIG. 3.

As shown in FIG. 3, controller 11 causes storage 15 to store course information for each course. It should be noted that in FIG. 3, the course positions represent positions on map data along which the user moves a finger or the like, and do not necessarily match the positions of the passage points. Also, the positions of the starting point and the ending point may be stored if the user sets them.

(B) Passage Determination Operation for Determining Single Passage Point

Next, the passage determination operation for determining a single passage point will be described according to the flow chart of FIG. 4.

Figure 4:
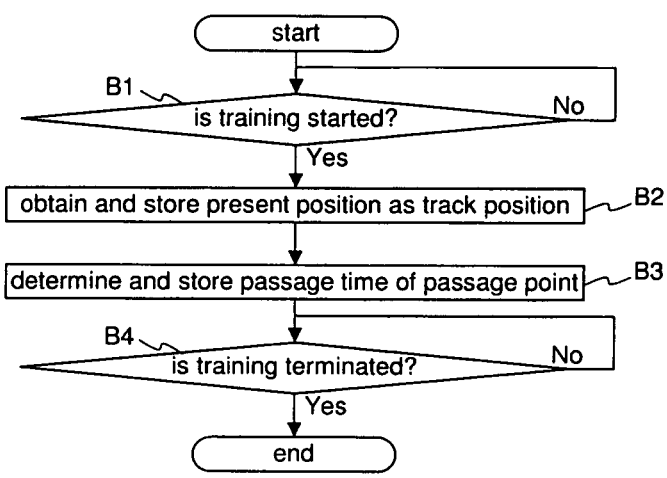
FIG. 4 is a flow chart showing a passage determination operation for determining a single passage point in the passage determination device illustrated in FIG. 1.

As shown in FIG. 4, first, in step B1, controller 11 determines whether or not the user starts training. If, for example, the course information shown in FIG. 3 does not include a position of the starting point, controller 11 determines that the training has started when the user turns the GPS on, and if the position of the starting point is stored, controller 11 determines that the training has started when the track points stored in storage 15 enter a predetermined range centered around the position of the starting point.

When the training starts, in step B2, controller 11 uses position obtaining unit 14 to obtain present positions of passage determination device 10 at predetermined intervals, and causes storage 15 to store the obtained present positions as track points with obtained times.

Next, controller 11 reads out the track points stored in storage 15 in chronological order and follows them.

If the track points read out from storage 15 enter the predetermined range centered around the position of the passage point, in step B3, controller 11 determines the time at which the user passes through the passage, point based on a track point, of the track points within the predetermined range, closest to the passage point and the time at which the track point is obtained, and causes storage 15 to store the determined time of passage.

For example, because of a positioning error of the GPS, there are times when after the track points enter the predetermined range and then after the track points exit the predetermined range, they then again enter the predetermined range. In this case, a target track point cannot be determined or it may be determined that the same passage point has passed through twice. If the track points are outside the predetermined range for a certain time period or longer, although there may be a positioning error of the GPS, it is highly likely that the user will have already moved away from the passage point. Therefore, in step B3, in a case where after the track points enter the predetermined range, the track points then exit the predetermined range for a certain time period or longer; the track points obtained by the time at which the last track point within the predetermined range is determined, the track points being within the predetermined range, are especially used to determine the time of passage. It should be noted that the processing to determine the time at which the user passes through the passage point in step B3 is performed when the track points are outside the predetermined range around the passage point for a certain time period or longer.

After that, in step B4, controller 11 determines whether or not the user terminates the training, and if the training is terminated, controller 11 terminates the processing. At this time, for example, if the position of the ending point is not included in the course information shown in FIG. 3, controller 11 determines that the training is terminated when the user turns the GPS off, and if the position of the ending point is included, controller 11 determines that the training is terminated when the track points stored in storage 15 enter the predetermined range centered around the position of the ending point.

Now, the processing in step B3 of FIG. 4 to determine the passage time of the passage point will be described in detail according to the flow chart shown in FIG. 5.

Figure 5:
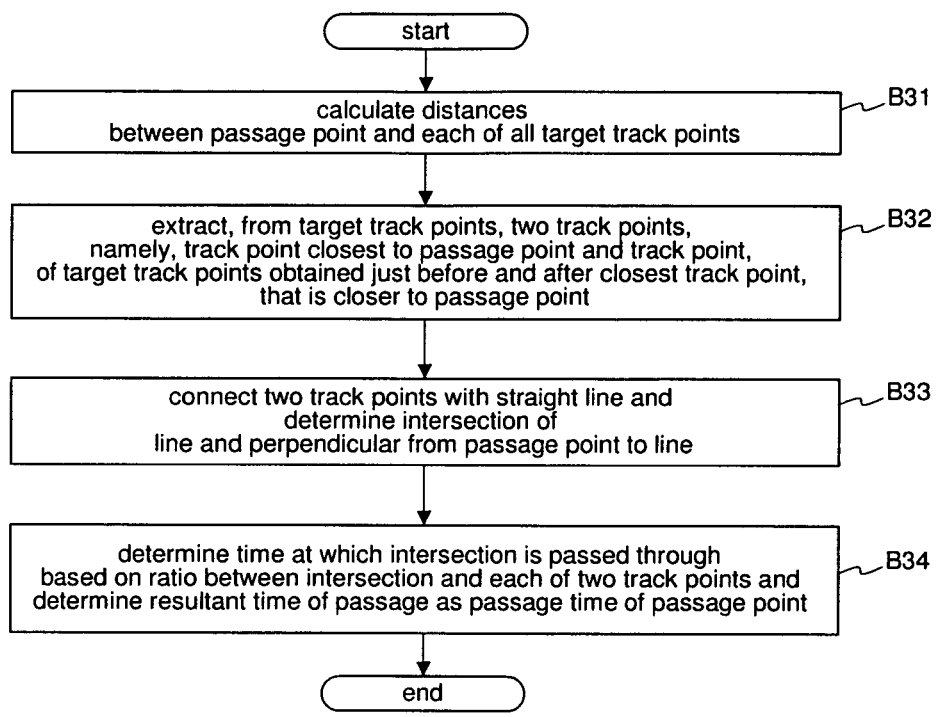
FIG. 5 is a flow chart showing processing for determining the passage time of the passage point in step B3 shown in FIG. 4.

As shown in FIG. 5, first, in step B31, controller 11 determines distances between the passage point and each of all the track points as targets within the predetermined range.

Next, in step B32, controller 11 extracts, from the target track points, two track points, namely, a track point that is closest to the passage point and a track point, of track points obtained just before and after the closest track point, that is closer to the passage point.

Next, in step B33, controller 11 connects the extracted two track points with a straight line, and determines an intersection of the line and a perpendicular from the passage point to the line.

After that, in step B34, controller 11 determines the time at which the user passes through the obtained intersection based on the ratio between the intersection and each of the extracted two track points, and determines the resultant time of passage as the time at which the user passes through the passage point.

Figure 6:
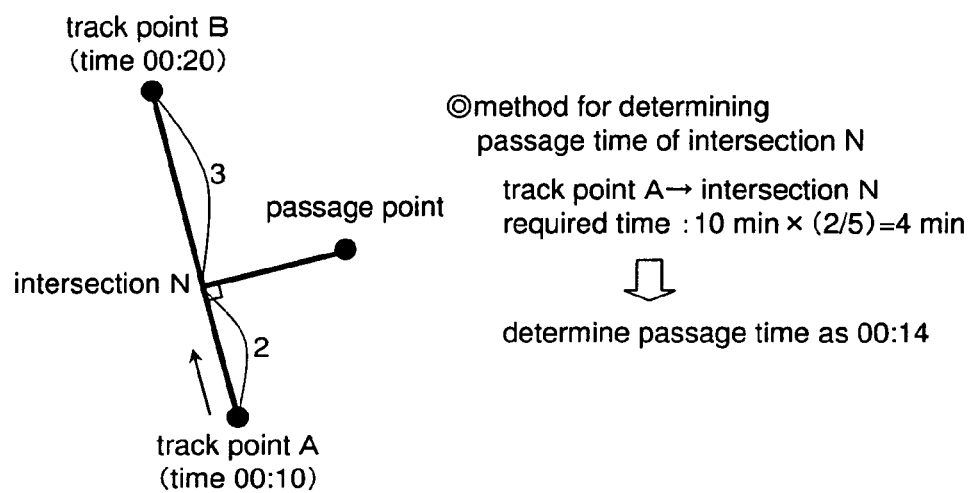
FIG. 6 illustrates a specific example of an intersection, based on which the time of passage is determined in FIG. 5.

Now, the processing in FIG. 5 will be specifically described by referring to an example illustrated in FIG. 6.

As illustrated in FIG. 6, for example, in step B32, it is assumed that controller 11 extracts, from the target track points, track point A (obtained time: "00:10") closest to the passage point and track point B (obtained time: "00:20") obtained just after point A.

In this case, in step B33, controller 11 connects between track point A and track point B, and determines intersection N of the line and the perpendicular from the passage point to the line.

At this time, if it is assumed that a ratio of the distance between intersection N and track point A to the distance between intersection N and track point B is 2 to 3, since a required time from track point A to track point B is ten minutes, in step B34, controller 11 determines that the required time from track point A to intersection N is: 10 (min)×(2/5)=4 (min), determines that the time at which user passes through intersection N is "00:14," and determines this time as the time at which the user passes through the passage point.

(C) Passage Determination Operation for Determining Multiple Passage Points

Next, the passage determination operation for determining multiple passage points will be described according to the flow chart in FIG. 7.

Figure 7:
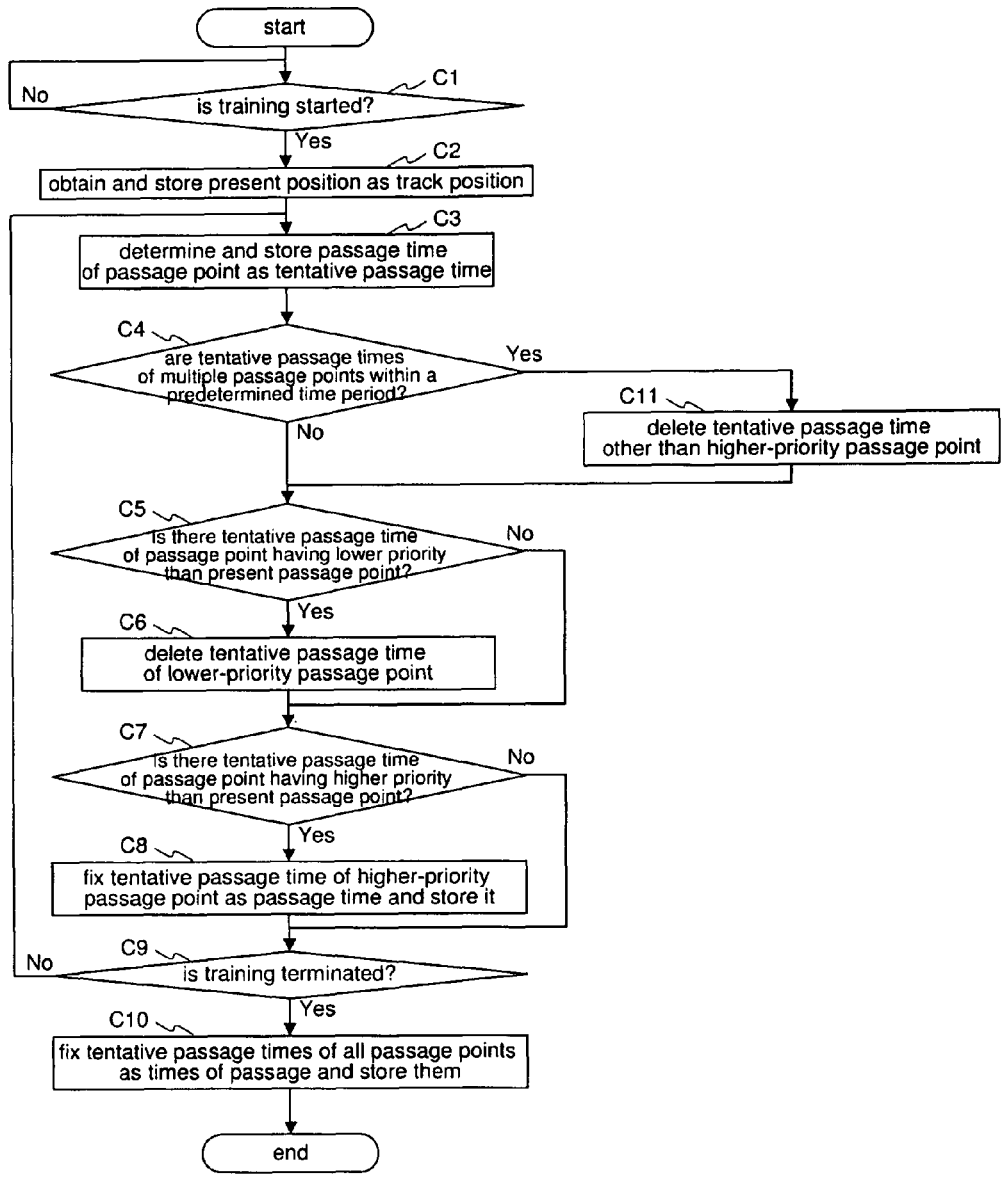
FIG. 7 is a flow chart showing a passage determination operation for determining multiple passage points in the passage determination device illustrated in FIG. 1.

As shown in FIG. 7, first, in step C1, controller 11 determines whether or not the user starts training. Here, controller 11 determines the start of the training in the same manner as that of step B1 in FIG. 4.

When the training is started, in step C2, controller 11 uses position obtaining unit 14 to obtain present positions of passage determination device 10 at predetermined intervals, and causes storage 15 to store the obtained present positions as track points.

After that, controller 11 reads out the track points stored in storage 15 in chronological order and follows them.

If the track points read out from storage 15 enter a predetermined range around any one of the passage points, in step C3, controller 11 determines the time at which the user passes through the passage point based on, of the track points within the predetermined range, the track point closest to the passage point and the time at which the track point is obtained. Here, in the same manner as step B3 in FIG. 4 and FIG. 5, the time of passage is determined. It should be noted that the processing in step C3 to determine the passage time of the passage point is performed when the track points are outside the predetermined range around the passage point for a certain time period or longer or the track points enter a predetermined range around a next passage point. Then, controller 11 causes storage 15 to store the passage time of the passage point determined to have been passed through as a tentative passage time.

Next, in step C4, controller 11 determines whether or not tentative passage times stored in storage 15 at which the user passes through the passage points are within a predetermined time period (e.g., three seconds).

For example, in a two-way course, if passage points on a first half and a second half are set at positions of substantially the same latitude and longitude or in a circuit course, if passage points for different laps are set at positions of substantially the same latitude and longitude, tentative times of passage of these passage points may be within a predetermined time period. Note that the tentative passage times of both the passage points are assumed to be not the same time but within the predetermined time period because the processing of controller 11 may be delayed.

In step C4, if the tentative times of passage of a plurality of passage points are not within the predetermined time period, in step C5, controller 11 determines whether or not a passage point having a lower priority than the passage point determined to be passed though in step C3 (hereinafter, referred to as a present passage point), namely, a tentative passage time of a passage point that has not been passed through yet is stored in storage 15, and if stored, in step C6, the tentative passage time of the lower-priority passage point is deleted from storage 15.

Also, in step C7, controller 11 determines whether or not a passage point having a higher-priority than the present passage point, namely, a tentative passage time of the passage point that has been passed through is stored in storage 15, and if stored, in step C8, controller 11 fixes the tentative passage time of the higher-priority passage point as the time of passage, and causes storage 15 to store it.

Next, in step C9, controller 11 determines whether or not the user terminates the training. Here, the termination of the training is determined in the same manner as step B4 in FIG. 4.

In step C9, if the training has not been terminated, the processing returns to step C3, and when the track points enter a predetermined range around a next passage point, the same processing is performed.

If the training has been terminated in step C9, in step C10, tentative passage times of all the passage points stored in storage 15 are fixed to be the times of passage, and controller 11 causes storage 15 to store the times and terminates the processing.

On the other hand, in step C4, if the tentative times of passage of a plurality of passage points are within the predetermined time period, in step C11, controller 11 deletes tentative passage times other than the highest-priority passage point of the passage points from storage 15. Then, the highest-priority passage point is regarded as the present passage point, and the proceeding proceeds to step C5.

Figure 9:
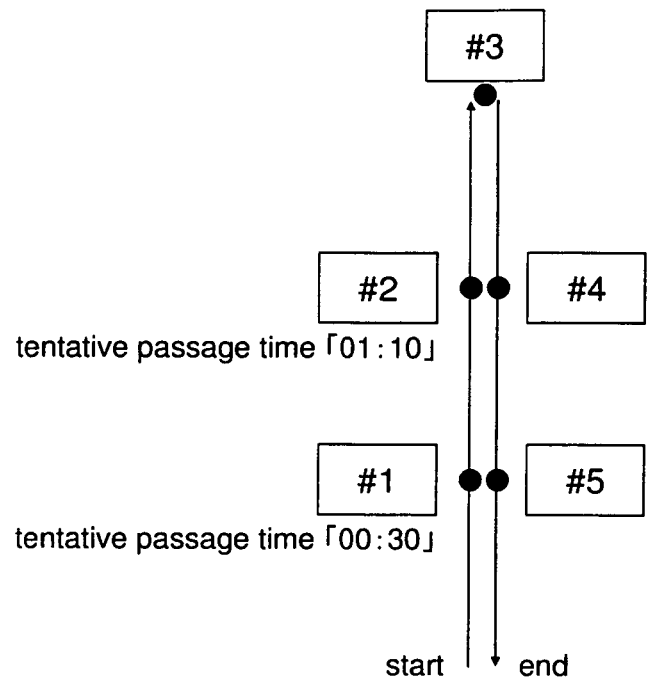
FIG. 9 illustrates another specific example of a two-way course in which the determination is made in FIG. 7.
Figure 10:
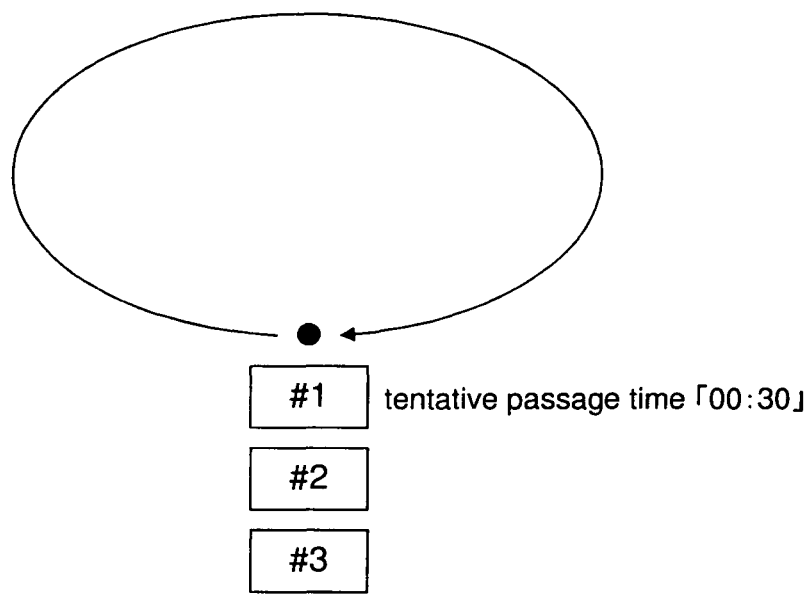
FIG. 10 illustrates a specific example of a circuit course in which the determination is made in FIG. 7.

Now, the processing in FIG. 7 will be specifically described. It should be noted that examples of courses in which a plurality of passage points are set include a course in which the user does not pass through substantially the same positions (e.g., a straight course), but in the following description, in order to describe a characteristic operation of the present invention, as shown in FIGS. 8 to 10, by way of example, referring to a two-way course or a circuit course in which the user passes through substantially the same positions, the processing shown in FIG. 7 will be described.

(C-1) First Example

Figure 8:
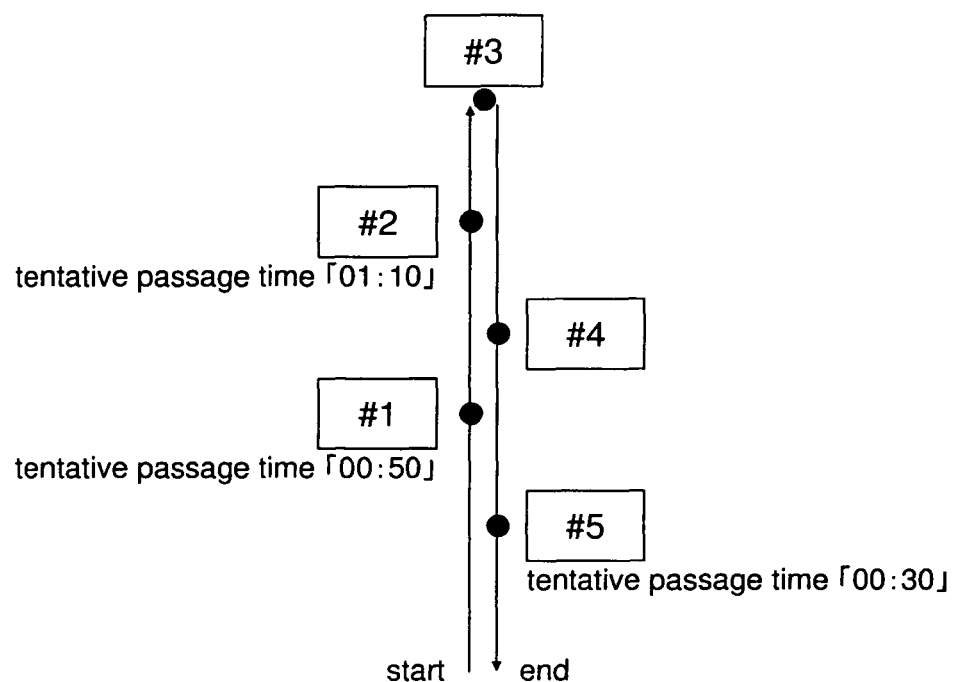
FIG. 8 illustrates a specific example of a two-way course in which the determination is made in FIG. 7.

As shown in FIG. 8, a two-way course is taken as an example. In this course, the user passes through the passage points in order of #1 to #2 in a first half, goes to the passage point #3 and then returns. In a second half, the user passes through the passage points in order of #4 to #5. That is, the passage order is as follows: the passage points #1, #2, #3, #4 and #5. The priorities descend in this order. Also, in the example, the first and the second halves do not include passage points that have substantially the same latitude and longitude.

In the example, when the user travels along the first half, the user first passes through a predetermined range around the passage point #5 set on the second half.

Therefore, the time of passage of the passage point #5 is determined to be "00:30" in step C3, and the time is stored as a tentative passage time. At this moment, since a tentative passage time other than that of the passage point #5 is not stored, deletion or fixing of a tentative passage time is not carried out and the proceeding returns from step C9 to step C3.

Then, when the user travels further along the first half, the user passes through a predetermined range around the passage point #1 set on the first half.

Thus, in step C3, the time of passage of the passage point #1 is determined to be "00:50," and the time is stored as a tentative passage time. At this moment, only the tentative passage time of the passage point #5, "00:30," is stored, and a tentative passage time within the predetermined time period from "00:50" is not stored. Therefore, the processing proceeds from step C4 to step C5. Now, since the passage point #5 has a lower priority than the present passage point #1, the tentative passage time of the passage point #5 is deleted in step C6.

A description of the subsequent steps is omitted.

(C-2) Second Example

As shown in FIG. 9, another two-way course is taken as an example. In this course, the user passes through the passage points in order of #1 to #2 in a first half, goes to the passage point #3, and then returns. In the second half, the user passes through the passage points in order of #4 to #5. That is, the passage order is as follows: the passage points #1, #2, #3, #4 and #5. The priorities descend in this order. However, the example is different from the first example. Specifically, a position of the passage point #1 in the first half and the position of the passage point #5 in the second half have substantially the same latitude and longitude, and a position of the passage point #2 in the first half and a position of the passage point #4 in the second half have substantially the same latitude and longitude.

In the example, when the user travels along the first half, the user first passes through a predetermined range around the passage point #1 set on the first half and a predetermined range around the passage point #5 set on the second half.

Therefore, the passage times of the passage points #1 and #5 are determined in step C3.

If the passage times of the passage points #1 and #5 are both determined to be "00:30" and the times are stored as tentative passage times, the proceeding proceeds from step C4 to step C11. At this time, since the passage point #1 has the highest priority, the tentative passage time of the passage point #5 is deleted in step C11. Then, the processing proceeds to step C5, but since a tentative passage time other than that of the passage point #1 is not stored at this moment, deletion or fixing of a tentative passage time is not carried out and the proceeding returns from step C9 to step C3.

Then, if the user travels further along the first half, the user passes through a predetermined range around the passage point #2 set on the first half and a predetermined range around the passage point #4 set on the second half.

Thus, now in step C3, the passage times of the passage points #2 and #4 are determined. If the passage times of the passage points #2 and #4 are both determined to be "01:10" and the times are stored as tentative times of passage, the processing proceeds from step C4 to step C11. At this time, since the passage point #2 has the highest priority, the tentative passage time of the passage point #4 is deleted in step C11. Then, the processing proceeds to step C5. Now, since the passage point #1 has a higher priority than the present passage point #2, the tentative passage time of the passage point #1 is fixed as the time of passage in step C8, and the processing returns from step C9 to step C3.

A description of the subsequent steps is omitted.

(C-3) Third Example

As shown in FIG. 10, a circuit course is taken as an example. In this course, the user travels along the same course three times, and the user passes through the passage point #1 on a first lap, the passage point #2 on a second lap, and the passage point #3 on a third lap. That is, the passage order is as follows: the passage points #1, #2 and #3. The priorities descend in this order. Also, in the example, positions of the passage points #1 to #3 on the first to third laps have substantially the same latitude and longitude.

In this example, when the user completes the first lap, the user passes through a predetermined range around the passage points #1 to #3 set on the first to the third laps.

Therefore, the passage times of the passage points #1 to #3 are determined in step C3. If the passage times of the passage points #1 to #3 are all determined to be "00:30" and the times are stored as tentative passage times, the proceeding proceeds from step C4 to step C11. At this time, since the passage point #1 has the highest priority, the tentative passage times of the passage points #2 and #3 are deleted in step C11. Then, the processing proceeds to step C5, but since a tentative passage time other than that of the passage point #1 is not stored at this moment, deletion or fixing of a tentative passage time is not carried out and the proceeding returns from step C9 to step C3.

Then, when the user completes the second lap, the user passes through the predetermined range around the passage points #1 to #3 set on the first to third laps.

However, since the tentative passage time of the passage point #1 has already been stored, now times of passage of the passage points #2 and #3 are determined in step C3. If the times of passage of the passage points #2 and #3 are both determined to be "01:00" and the times are stored as tentative times of passage, the processing proceeds from step C4 to step C11. At this moment, since the passage point #2 has the highest priority, the tentative passage time of the passage point #3 is deleted in step C11. Then, the processing proceeds to step C5. Now, since the passage point #1 has a higher priority than the present passage point #2, the tentative passage time of the passage point #1 is fixed as the time of passage in step C8, and the processing returns from step C9 to step C3.

A description of the subsequent steps is omitted.

(D) Lap Time Display Operation in the Case where there are Multiple Passage Points Next, in a case where there are a plurality of passage points, an operation for displaying a lap time indicating a time required between the passage points will be described.

As shown in FIG. 11, in order to allow a lap time for each unit of training to be determined and displayed, controller 11 causes storage 15 to store information of each training unit in association with a training identifier (in FIG. 11, a date) of each training unit. It should be noted that in FIG. 11, if a position of a starting point is included in the course information shown in FIG. 3, a starting time is a time at which track points stored in storage 15 enter a predetermined range centered around the position of the starting point, and if the position of the starting point is not stored, a starting time is the time at which the user turns the GPS on. Also, if a position of an ending point is stored in the course information shown in FIG. 3, the ending time is the time at which track points stored in storage 15 enter a predetermined range centered around the position of the ending point, and if the position of the ending point is not stored, the ending time is the time at which the user turns the GPS off.

Figure 12:
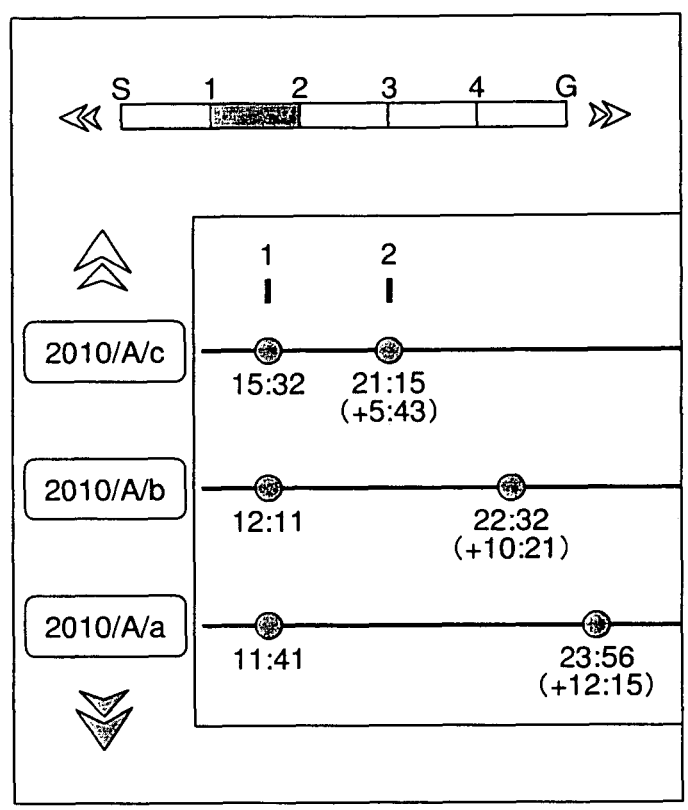
FIG. 12 illustrates an example of a screen image displayed in a display illustrated in FIG. 1, showing lap times between passage points.

To display a lap time, controller 11 causes display 12 to display an image like a screen shown in FIG. 12. A top belt-like area of this screen indicates a starting point, each passage point, and an ending point, and the user touches an area between passage points of the belt-like area (in FIG. 12, an area between the passage points #1 and #2) to give an instruction to display a lap time between the passage points.

Controller 11 sets an axis for each unit of training (in FIG. 12, for each date of training) on the screen, the axes being parallel to each other.

For example, if an instruction to display a lap time between the passage points #1 and #2 is received, controller 11 determines a lap time between the passage points #1 and #2 for each unit of training, and places, on the axis, dots of the passage times of the passage points #1 and #2 apart from one another by a distance corresponding to the lap time between the passage points #1 and #2. At this time, positions of the dots on the axes denoting the passage times of the passage points #1 of the training units are matched with each other in a direction orthogonal to the axis.

As described above, in this exemplary embodiment, if positions obtained by the device enter a predetermined range of a passage point, the device determines the passage time of the passage point based on the position, from among obtained positions within the predetermined range, that is closest to the passage point and the time at which the position is obtained.

Thus, unlike the related arts in which, when positions of the device enter a predetermined range of a passage point, the time is immediately determined to be the time of passage, in this exemplary embodiment, the time of passage is determined based on a position, from among positions within a predetermined range, that is closest to the passage point and the time at which the position is obtained.

Therefore, even if a position of the device has a positioning error, it is highly likely that the determined time of passage is close to the actual time of passage. As a result, the determination accuracy of the time at which the user passes through the passage point can be improved.

Also, in the exemplary embodiment, if there are a plurality of passage points, priorities are set to the passage points according to the order of the user passing through the points, and if the time at which the user passes through the passage point is determined, the determined time of passage is stored as a tentative passage time.

Once the tentative passage time of the passage point is stored, the tentative passage time of the passage point having a lower priority than the passage point is deleted, and the tentative passage time of the passage point having a higher priority is fixed as the time of passage. Also, when the training is terminated, the tentative passage times of all the passage points are fixed as the times of passage (the first to third processing).

Therefore, in a two-way course like shown in FIG. 8, in a case where while traveling along the first half, the device determines first the time of passage of the passage point #5, which is on the second half and which is to be passed through later, the fixing of the tentative passage time of the passage point #5 can be avoided.

Furthermore, in the exemplary embodiment, when the tentative passage time of a passage point is stored, if tentative passage times of a plurality of passage points are within a predetermined time period, the tentative passage times of the passage points other than the highest-priority passage point are deleted, and then the first to third processing is performed.

Thus, as shown in FIG. 9, in the two-way course in which the first half and the second half have the passage points #1 and #5 (also #2 and #4) at substantially the same positions, and as shown in FIG. 10, in the circuit course in which different laps have the passage points #1 to #3 at substantially the same positions, even if tentative passage times of these passage points are within a predetermined time period, the tentative passage time of the passage point to be passed through later can be deleted before the first to third processing is performed.

Therefore, even if training is conducted in a two-way course or a circuit course, the time at which the user passes through a passage point can be determined without complicated processing.

In addition, in the exemplary embodiment, if an instruction to display a lap time between the first and the second passage points is received, as shown in FIG. 12, one of axes parallel to each other is set for each unit of training, and on the axis, dots indicating the passage times of the first and the second passage points are placed apart from one another by a distance corresponding to the lap time. At this time, positions of the dots on the axes denoting the passage times of the first passage points of the training units are matched with each other in the direction orthogonal to the axes.

Thus, the positions of the dots on the axes denoting the passage times of the first passage points of the training units are matched with each other in the direction orthogonal to the axes, and the dots denoting the passage times of the first and the second passage points are placed apart from each other by a distance corresponding to the lap time, so that the lap time difference between the training units can clearly be displayed.

The present invention has been described above with reference to the exemplary embodiments, but the present invention is not limited to the exemplary embodiments described above. Various modifications that those skilled in the art can understand may be made to the configuration and details of the present invention within the scope of the present invention.

For example, in the exemplary embodiment, the example in which the present invention is applied to training in which the user rides a bicycle along a course has been described, but the present invention is not limited thereto. The present invention can be applied to other training that uses other means (a car, a motorcycle, human feet, or the like) to travel along a course. For example, the present invention can be applied to a car race, a motorcycle race, a marathon, a triathlon, and the like.

Also, the method executed in a mobile terminal of the present invention may be applied to a program to be executed by a computer. In addition, the program may be stored in a storage medium.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A passage determination device carried by a user who travels along a pre-set course by any means as training, the device comprising:
a storage;
a position information obtaining unit that obtains positions of the device at predetermined intervals; and
a controller that causes said storage to store a course and a position of a passage point on the course set in advance by the user, and that causes said storage to store the positions obtained by said position information obtaining unit as well as times at which the positions are obtained,
wherein said controller determines, if positions of the device enter a predetermined range of the passage point, a time at which the user passes through the passage point based on a position, from among the obtained positions within the predetermined range, that is closest to the passage point and a time at which the position is obtained, and
wherein said controller determines the time of passage by using, if positions of the device enter the predetermined range and then are outside the predetermined range for a certain time period or longer, positions obtained by the time at which the last position within the predetermined range is determined, the positions being within the predetermined range.

2. A passage determination device carried by a user who travels along a pre-set course by any means as training, the device comprising:
a storage;
a position information obtaining unit that obtains positions of the device at predetermined intervals; and
a controller that causes said storage to store a course and a position of a passage point on the course set in advance by the user, and that causes said storage to store the positions obtained by said position information obtaining unit as well as times at which the positions are obtained,
wherein said controller determines, if positions of the device enter a predetermined range of the passage point, a time at which the user passes through the passage point based on a position, from among the obtained positions within the predetermined range, that is closest to the passage point and a time at which the position is obtained, and
wherein said controller determines the passage time of the passage point by:
extracting a position closest to the passage point and a position, from among positions obtained just before and after the closest position, that is closer to the passage point;
connecting the two positions with a line;
determining an intersection of the line and a perpendicular line from the passage point to the line; and
determining the time at which the user passed through the intersection based on a ratio between the intersection and each of the extracted two positions to determine the determined time of passage to be the passage time of the passage point.

3. A passage determination device carried by a user who travels along a pre-set course by any means as training, the device comprising:
a storage;
a position information obtaining unit that obtains positions of the device at predetermined intervals; and
a controller that causes said storage to store a course and a position of a passage point on the course set in advance by the user, and that causes said storage to store the positions obtained by said position information obtaining unit as well as times at which the positions are obtained,
wherein said controller determines, if positions of the device enter a predetermined range of the passage point, a time at which the user passes through the passage point based on a position, from among the obtained positions within the predetermined range, that is closest to the passage point and a time at which the position is obtained;
wherein said controller sets, if there are a plurality of passage points, priorities to the passage points according to the order of the user passing through the points and causes said storage to store the set priorities with the positions of the passage points;
wherein said controller causes said storage to, if a passage time of any one of the passage points is determined, store the determined passage time as a tentative passage time of the passage point;
wherein said controller performs first processing that, when the tentative passage time of the passage point is stored in said storage, if a tentative passage time of a passage point having a lower priority than the passage point is stored in said storage, deletes the tentative passage time of the passage point having the lower priority from said storage;
wherein said controller performs second processing that, when the tentative passage time of the passage point is stored in said storage, if a tentative passage time of a passage point having a higher priority than the passage point is stored in said storage, fixes the tentative passage time of the passage point having the higher priority as the time of passage and causes said storage to store the fixed time of passage; and
wherein said controller performs third processing that, when the training is terminated, fixes tentative passage times of all passage points stored in said storage as the times of passage, and that causes said storage to store the fixed time of passage.

4. The passage determination device according to claim 3, wherein said controller deletes, when the tentative passage time of the passage point is stored in said storage, if the tentative passage times of the passage points stored in said storage are within a predetermined time period, the tentative passage times of the passage points other than the passage point having the highest priority of the passage points from said storage, and then performs the first processing to the third processing.

5. The passage determination device according to claim 3, wherein said controller causes said storage to, for each training unit, store a fixed passage time of each passage point, and
wherein if an instruction to display a lap time indicating a required time from a first passage point to a second passage point of the passage points is received,
said controller sets, on a screen of the device, one of axes parallel to each other for each training unit, and places, on the axis, dots apart from one another by a distance corresponding to the lap time between the first and the second passage points, the dots denoting the passage times of the first and the second passage points, and matches positions of the dots on the axes denoting the passage times of the first passage points of the training units with each other in a direction orthogonal to the axis.

6. A passage determination method adopted to a passage determination device carried by a user who travels along a pre-set course by any means as training, the method comprising:
 causing a storage to store a course and a position of a passage point on the course set in advance by the user;
 obtaining positions of the device at predetermined intervals and causing said storage to store the obtained positions and times at which the positions are obtained;
 determining a time of passage at which the user passes through the passage point based on, if positions of the device enter a predetermined range of the passage point, a position, from among the obtained positions within the predetermined range, that is closest to the passage point and a time at which the position is obtained; and
 determining a time of passage of the passage point by using, if positions of the device enter the predetermined range and then are outside the predetermined range for a certain time period or longer, positions obtained by the time at which the last position within the predetermined range is determined, the positions being within the predetermined range.

7. A passage determination method adopted to a passage determination device carried by a user who travels along a pre-set course by any means as training, the method comprising:
 causing a storage to store a course and a position of a passage point on the course set in advance by the user;
 obtaining positions of the device at predetermined intervals and causing said storage to store the obtained positions and times at which the positions are obtained;
 determining a time of passage at which the user passes through the passage point based on, if positions of the device enter a predetermined range of the passage point, a position, from among the obtained positions within the predetermined range, that is closest to the passage point and a time at which the position is obtained;
 extracting a position closest to the passage point and a position, from among positions obtained just before and after the closest position, that is closer to the passage point;
 connecting the two positions with a line;
 determining an intersection of the line and a perpendicular line from the passage point to the line; and
 determining the time at which the user passed through the intersection based on a ratio between the intersection and each of the extracted two positions to determine the determined time of passage to be the passage time of the passage point.

8. A passage determination method adopted to a passage determination device carried by a user who travels along a pre-set course by any means as training, the method comprising:
 causing a storage to store a course and a position of a passage point on the course set in advance by the user;
 obtaining positions of the device at predetermined intervals and causing said storage to store the obtained positions and times at which the positions are obtained;
 determining a time of passage at which the user passes through the passage point based on, if positions of the device enter a predetermined range of the passage point, a position, from among the obtained positions within the predetermined range, that is closest to the passage point and a time at which the position is obtained;
 setting, if there are a plurality of passage points, priorities to the passage points according to the order of the user passing through the points and causing said storage to store the set priorities with the positions of the passage points;
 causing said storage to, if a passage time of any one of the passage points is determined, store the determined passage time as a tentative passage time of the passage point;
 performing first processing that, when the tentative passage time of the passage point is stored in said storage, if a tentative passage time of a passage point having a lower priority than the passage point is stored in said storage, deletes the tentative passage time of the passage point having the lower priority from said storage;
 performing second processing that, when the tentative passage time of the passage point is stored in said storage, if a tentative passage time of a passage point having a higher priority than the passage point is stored in said storage, fixes the tentative passage time of the passage point having the higher priority as a time of passage and causing said storage to store the fixed time of passage; and
 performing third processing that, when the training is terminated, fixes tentative passage times of all passage points stored in said storage as the times of passage, and causing said storage to store the fixed time of passage.

9. The passage determination method according to claim 8, further comprising deleting, when the tentative passage time of the passage point is stored in said storage, if the tentative passage times of the passage points stored in said storage are within a predetermined time period, the tentative passage times of the passage points other than the passage point having the highest priority of the passage points from said storage, and then performing the first processing to the third processing.

10. The passage determination method according to claim 8, further comprising:
 causing said storage to, for each training unit, store a fixed passage time of each passage point; and
 setting, if an instruction to display a lap time indicating a required time from a first passage point to a second passage point of the passage points is received, on a screen of the device, one of axes parallel to each other for each training unit, and placing, on the axis, dots apart from one another by a distance corresponding to the lap time between the first and the second passage points, the dots denoting the passage times of the first and the second passage points, and matching positions of the dots on the axes denoting the passage times of the first passage points of the training units with each other in a direction orthogonal to the axis.

* * * * *